(12) United States Patent  
Kon

(10) Patent No.: US 9,110,366 B2  
(45) Date of Patent: Aug. 18, 2015

(54) AUDIOVISUAL APPARATUS

(76) Inventor: Homare Kon, Tokyo (JP)

(*) Notice: Subject to any disclaimer, the term of this patent is extended or adjusted under 35 U.S.C. 154(b) by 393 days.

(21) Appl. No.: 13/029,709

(22) Filed: Feb. 17, 2011

(65) Prior Publication Data

US 2011/0221975 A1    Sep. 15, 2011

(30) Foreign Application Priority Data

Mar. 9, 2010  (JP) ................ P2010-051969

(51) Int. Cl.
- H04R 5/02  (2006.01)
- G03B 31/00 (2006.01)
- H04S 7/00  (2006.01)

(52) U.S. Cl.
CPC ............... G03B 31/00 (2013.01); H04S 7/301 (2013.01); *H04S 2400/11* (2013.01); *H04S 2420/01* (2013.01)

(58) Field of Classification Search
CPC ....... H04S 2400/15; H04S 7/40; H04S 7/303; H04S 7/304; H04S 7/301; H04S 7/00; H04R 2499/11; H04M 2250/54; H04M 2250/52; H04M 2250/20; G03B 2205/0061; G03B 2205/0069; G03B 2205/0084; G03B 31/02; G03B 31/04; G03B 31/06; G03B 31/08; G03B 21/00; H04N 5/74
USPC ......... 381/1, 2, 12, 98, 17–23, 101, 102, 103, 381/119, 302, 303, 304, 305, 306, 307, 309, 381/310, 3, 11, 333, 334, 120, 74, 80, 61; 359/443, 444, 445, 448, 383; 700/94; 352/1, 2, 3, 4, 5, 6, 8, 9, 10, 11, 12, 15, 352/16, 18, 19, 13, 14, 25, 140; 353/15, 18, 353/19, 76; 348/345, 231.4
See application file for complete search history.

(56) References Cited

U.S. PATENT DOCUMENTS

| | | | |
|---|---|---|---|
| 2,028,484 A * | 1/1936 | Wright | 353/33 |
| 2007/0101394 A1 * | 5/2007 | Fu et al. | 725/134 |
| 2007/0189551 A1 * | 8/2007 | Kimijima | 381/97 |

(Continued)

FOREIGN PATENT DOCUMENTS

| | | |
|---|---|---|
| JP | 07-319487 | 12/1995 |
| JP | 08-084400 | 3/1996 |
| JP | 2003-274500 | 9/2003 |

(Continued)

OTHER PUBLICATIONS

Office Action from corresponding Chinese Application No. 201110051887.3, issued May 23, 2014.

(Continued)

*Primary Examiner* — Leshui Zhang  
(74) *Attorney, Agent, or Firm* — Sony Corporation

(57) ABSTRACT

An audiovisual apparatus includes a video projection section, a focal length adjustment section, an acoustic processing section, and an audio output section. The video projection section projects video corresponding to a video signal. The focal length adjustment section adjusts a focal length of the projected video. The acoustic processing section performs acoustic processing corresponding to the adjusted focal length, on an audio signal corresponding to the video signal. The audio output section outputs the audio signal on which the acoustic processing is performed.

9 Claims, 11 Drawing Sheets

(56) References Cited

U.S. PATENT DOCUMENTS

| | | | |
|---|---|---|---|
| 2009/0141903 A1* | 6/2009 | Watanabe et al. | 381/17 |
| 2010/0110232 A1* | 5/2010 | Zhang et al. | 348/240.3 |

FOREIGN PATENT DOCUMENTS

| | | | |
|---|---|---|---|
| JP | 2005-117624 | | 4/2005 |
| JP | 2005-117624 A | | 4/2005 |
| JP | 2005117624 A | * | 4/2005 |
| JP | 2005-286903 | | 10/2005 |
| JP | 2006-030934 | | 2/2006 |
| JP | 2006-078963 | | 3/2006 |
| JP | 2007-142875 | | 6/2007 |
| JP | 2007266967 A | * | 10/2007 |
| JP | 2009-044261 | | 2/2009 |

OTHER PUBLICATIONS

Japanese Office Action for corresponding Japanese Application No. 2010-051969, dated Feb. 25, 2014.

Japanese Office Action issued in corresponding Japanese Application No. 2010-051969 on Dec. 2, 2014.

* cited by examiner

AUDIOVISUAL APPARATUS

BACKGROUND OF THE INVENTION

1. Field of the Invention

The present invention relates to an audiovisual apparatus capable of projecting video and outputting audio.

2. Description of the Related Art

In recent years, the multichannel system of audio (music) such as a 5.1 channel system is prevailing in an audiovisual apparatus used for a home theater or the like. This system forms stereo sound around an audience and enhances the sense of realism by arranging speakers around the audience and outputting audio from a lateral side and back side in addition to the front of the audience (the direction of video). Further, there is also developed a technique of forming stereo sound around an audience by adjusting an intensity level or a timing at which audio is output even in two-channel speakers on the right and left (see, for example, Japanese Patent Application Laid-open No. 2007-142875 (paragraph [0039], FIG. 1), hereinafter referred to as Patent Document 1).

In an "acoustics correcting apparatus" disclosed in Patent Document 1, an acoustic transfer function between each speaker and a sound-collecting microphone is measured using the sound-collecting microphone and a plurality of speakers arranged around the sound-collecting microphone. When real audio that is output from a speaker is corrected based on the acoustic transfer function, the stereo sound is formed.

By such a stereo sound technique, virtual sound localization is enabled in which an audience feels as if a sound source (sound image) is present at a position different from the real position of a speaker. When the virtual sound localization is performed on audio at the position of a display, the audience can feel as if the sound image is present at the position of the display.

SUMMARY OF THE INVENTION

However, the stereo sound technique as described above is effective in a case where the relative positions of a video screen and a speaker are fixed, but the technique causes a problem if the relative positions thereof are not fixed. In other words, when the relative positions of a video screen and a speaker are varied, a virtual sound localization position differs from the position of the video screen. For example, in a case where a projector is used as a video display apparatus, the relative positions of a video screen and a speaker can be varied due to the position of the projector, a focus thereof, and the like. Therefore, it has been difficult to realize the virtual sound localization at the position of the video screen.

In view of the circumstances as described above, it is desirable to provide an audiovisual apparatus capable of outputting audio that has been subjected to acoustic processing corresponding to the position of projected video.

According to an embodiment of the present invention, there is provided an audiovisual apparatus including a video projection section, a focal length adjustment section, an acoustic processing section, and an audio output section.

The video projection section projects video corresponding to a video signal.

The focal length adjustment section adjusts a focal length of the projected video.

The acoustic processing section performs acoustic processing corresponding to the adjusted focal length, on an audio signal corresponding to the video signal.

The audio output section outputs the audio signal on which the acoustic processing is performed.

When the audiovisual apparatus projects video, a focus is adjusted by the focal length adjustment section and an instruction to start reproducing content is given with the video in focus. Therefore, during the reproduction of the content, the focal length of the video projection section can be considered as a video projection distance. Thus, the acoustic processing section performs the acoustic processing on the audio signal based on the focal length adjusted by the focal length adjustment section, with the result that the acoustic processing corresponding to the position of the video projected by the video projection section is performed. In other words, the audiovisual apparatus according to the embodiment of the present invention can project video and perform acoustic processing corresponding to the position of the projected video.

The acoustic processing section may include a digital filter, determine a filter coefficient of the digital filter based on the focal length, and uses the digital filter for the audio signal.

The digital filter can change a frequency response of the input audio signal and impart virtual transfer characteristics to the audio signal. When the filter coefficient used in the digital filter is changed, the virtual transfer characteristics are changed. The acoustic processing section determines a filter coefficient based on a focal length and performs digital filter processing on an audio signal with the use of the filter coefficient, with the result that the acoustic processing corresponding to the position of the projected video is enabled.

The acoustic processing section may select a filter coefficient corresponding to the focal length from filter coefficient candidates stored in advance for each distance range.

As described above, the acoustic processing section determines the filter coefficient based on the focal length. In this case, complicated computing processing is necessary when the filter coefficient is calculated from the focal length. However, in the audiovisual apparatus according to the embodiment of the present invention, the filter coefficient only has to be selected from filter coefficient candidates stored in advance, which does not need complicated computing processing. Accordingly, even in a case where the audiovisual apparatus is a portable apparatus or the like and has a limited capability of computing processing, it is possible to perform acoustic processing that corresponds to the position of projected video.

The video projection section may include a projection lens, and the focal length adjustment section may adjust a position of the projection lens.

In a video projection device, it is general to change the position of a projection lens in an optical system so as to change the focal length of projected video. In the audiovisual apparatus according to the embodiment of the present invention, the acoustic processing section performs acoustic processing corresponding to the position of the projection lens on the audio signal, the position being adjusted by the focal length adjustment section, with the result that the acoustic processing corresponding to the position of the projected video is enabled.

The acoustic processing section may perform virtual sound localization at a position separated by the focal length in a direction of an optical axis of the projection lens.

The position separated by the focal length in the direction of the optical axis of the projection lens can be considered as a position at which the video is being projected. By performing the virtual sound localization at the above-mentioned position by the audiovisual apparatus according to the embodiment of the present invention, it is possible for a user to feel as if audio is output from the projected video.

The audiovisual apparatus may further include a microphone configured to collect audio that is output from an external speaker arranged away from the audiovisual apparatus, and the acoustic processing section may estimate a position of the external speaker based on an output of the microphone and further perform the acoustic processing based on the position of the external speaker.

In a case where the audiovisual apparatus outputs audio from the external speaker that is away from the audiovisual apparatus, transfer characteristics exist between the external speaker and the user. The audiovisual apparatus according to the embodiment of the present invention outputs a test signal to the external speaker, collects audio output from the external speaker, and calculates the transfer characteristics thereof, with the result that the relative position of the external speaker with respect to a microphone, that is, the audiovisual apparatus can be estimated. The acoustic processing section performs the acoustic processing based on the position of the external speaker in addition to the focal length described above, with the result that the audiovisual apparatus according to the embodiment of the present invention can output audio that has been subjected to the acoustic processing corresponding to the position of the projected video.

According to the embodiment of the present invention, it is possible to output audio that has been subjected to acoustic processing corresponding to the position of projected video.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

(First Embodiment)

An audiovisual apparatus according to a first embodiment of the present invention will be described.

Figure 1:
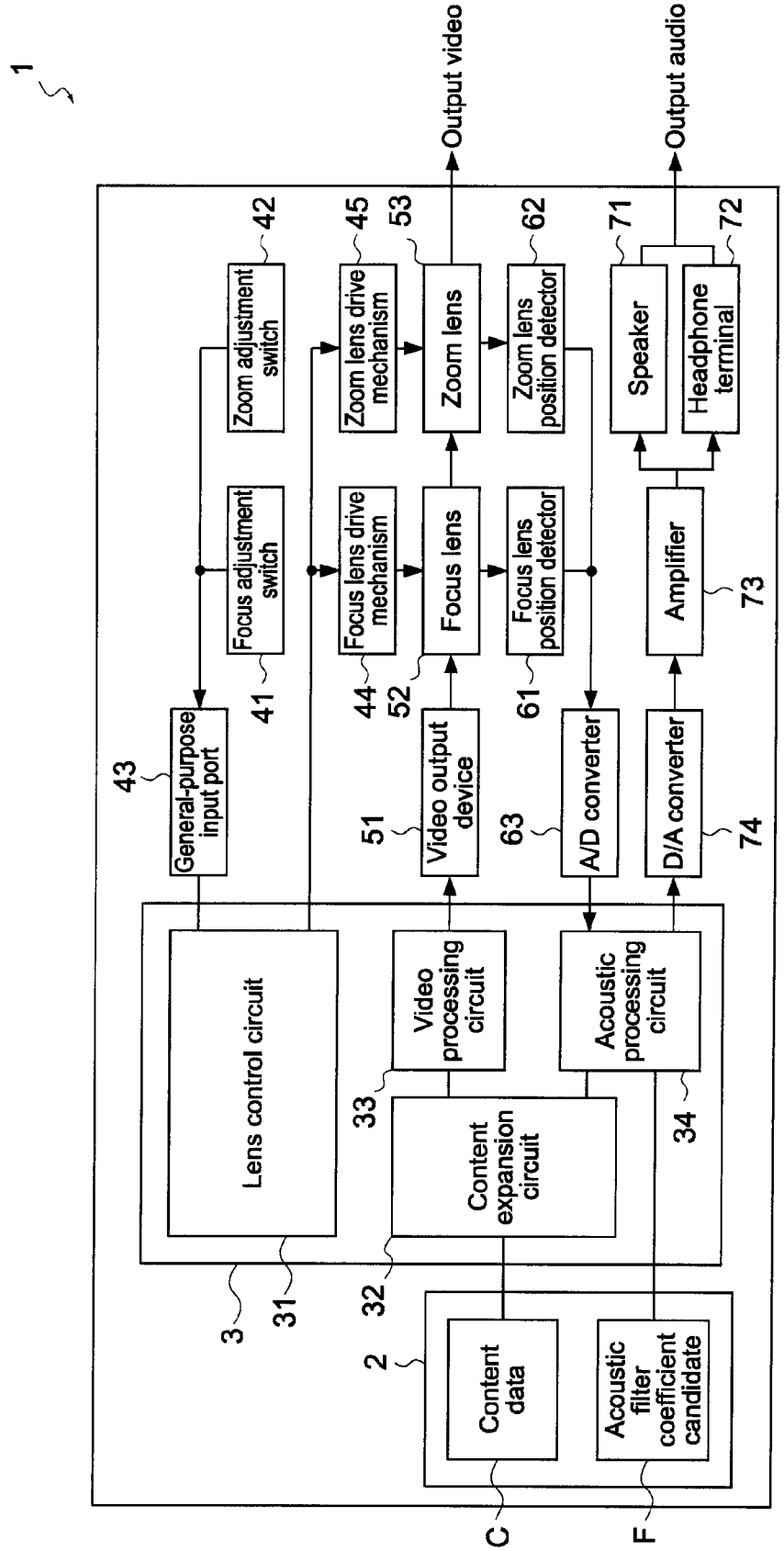
FIG. 1 is a block diagram showing an audiovisual apparatus according to a first embodiment of the present invention.

FIG. 1 is a block diagram showing the structure of an audiovisual apparatus 1 according to the first embodiment of the present invention.

The audiovisual apparatus 1 according to this embodiment is assumed to be a portable projector capable of projecting video and outputting audio (including output from headphone). Description will be given on the structures of the audiovisual apparatus 1 shown in FIG. 1.

The audiovisual apparatus 1 includes a storage section 2, a computing section 3, a video output system (video output device 51, focus lens 52, and zoom lens 53), an audio output system (D/A converter 74, amplifier 73, speaker 71, and headphone terminal 72), and the like.

The storage section 2 is a storage device such as a ROM (Read Only Memory), a RAM (Random Access Memory), an HDD (Hard disk drive), and an SSD (Solid State Drive).

Further, the storage section 2 may not be incorporated in the audiovisual apparatus 1, and may be an external HDD, memory card, or the like. Furthermore, the storage section 2 can be substituted by network connection.

The storage section 2 stores content data C and an acoustic filter coefficient candidate F. The content data C is data containing video information and audio information. The acoustic filter coefficient candidate F is a candidate of a coefficient used in the acoustic processing to be described later. The storage section 2 outputs the content data C and the acoustic filter coefficient candidate F to the computing section 3 in response to a request from the computing section 3.

The computing section 3 is a device capable of performing computation, and is typically a CPU (Central Processing Unit). The computing section 3 includes a lens control circuit 31, a content expansion circuit 32, a video processing circuit 33, and an acoustic processing circuit 34.

The lens control circuit 31 outputs a control signal to a focus lens drive mechanism 44 and a zoom lens drive mechanism 45 in response to operation inputs made by a user using a focus adjustment switch 41 and a zoom adjustment switch 42 to be described later. The content expansion circuit 32 expands and computes (performs decoding processing on) the content data C output from the storage section 2, and splits the resultant into a video signal and an audio signal. The content expansion circuit 32 outputs the video signal to the video processing circuit 33, and outputs the audio signal to the acoustic processing circuit 34.

The video processing circuit 33 performs video processing such as noise reduction, color tone correction, and RGB conversion on the video signal output from the content expansion circuit 32, and outputs the resultant video signal to the video output device 51. The acoustic processing circuit 34 performs acoustic processing to be described later on the audio signal output from the content expansion circuit 32. To the acoustic processing circuit 34, the acoustic filter coefficient candidate F is output from the storage section 2, and the position information of the focus lens 52 and the zoom lens 53 is also output.

The video output device 51 converts the video signal output from the video processing circuit 33 into a video beam. For the video output device 51, various devices of liquid crystal, an LED (Light Emitting Diode), "DLP (Digital Light Processing)" (registered trademark), an LCOS (Liquid crystal on silicon), "GLV (Grating Light Valve)" (registered trademark), a CRT (Cathode Ray Tube), and the like can be used.

The focus lens 52 is a lens for adjusting a focal length, and is provided so as to be movable in a direction of the optical axis of the video beam. The focus lens 52 is moved in the direction of the optical axis, thus varying the focal length of transmitted light with respect to the audiovisual apparatus 1. The zoom lens 53 is a lens for adjusting an angle of view and is provided so as to be movable in the direction of the optical axis of the video beam. The zoom lens 53 is moved in the direction of the optical axis, thus varying the size (enlargement magnification) of video. In this manner, the focus lens 52 and the zoom lens 53 constitute an optical system.

The focus adjustment switch 41 and the zoom adjustment switch 42 transmit the operation inputs made by the user to the lens control circuit 31 via a general-purpose input port 43. In response to the operation inputs transmitted from the focus adjustment switch 41, the focus lens drive mechanism 44 receives the control signal generated in the lens control circuit 31 and moves the focus lens 52 in the direction of the optical axis. The zoom lens drive mechanism 45 also receives the control signal generated in the lens control circuit 31 in response to the operation inputs transmitted from the zoom adjustment switch 42, and moves the zoom lens 53 in the direction of the optical axis. The focus lens drive mechanism 44 and the zoom lens drive mechanism 45 may include a stepper motor, for example.

A focus lens position detector 61 detects the position of the focus lens 52 in the direction of the optical axis, and outputs the position to the acoustic processing circuit 34 via an A/D (Analog/Digital) converter 63. Similarly, the zoom lens position detector 62 detects the position of the zoom lens 53 in the direction of the optical axis, and outputs the position to the acoustic processing circuit 34 via the A/D converter 63. The focus lens position detector 61 and the zoom lens position detector 62 detect the position of the focus lens and that of the zoom lens, respectively, by a detection method using a rotary encoder, a potentiometer, or the like. Further, in a case where the focus lens 52 and the zoom lens 53 are driven by the stepper motor, the positions of the respective lenses may be detected based on a drive history of the stepper motor.

A speaker 71 and a headphone terminal 72 are connected to the acoustic processing circuit 34 via an amplifier 73 and a D/A (Digital/Analog) converter 74. The speaker 71 can be constituted of two channels (stereo) or a larger number of channels. The headphone terminal 72 can be a terminal to which a headphone for two channels (stereo) is connected. The speaker 71 is integrally provided to the audiovisual apparatus 1.

The audiovisual apparatus 1 is structured as described above.

Hereinafter, the operation of the audiovisual apparatus 1 will be described.

When a power supply of the audiovisual apparatus 1 is turned on, the audiovisual apparatus 1 projects video (image) for video adjustment. The user moves the audiovisual apparatus 1 or operates the focus adjustment switch 41 and the zoom adjustment switch 42 to adjust the angle of view and the focus of video. Specifically, when the user operates the focus adjustment switch 41, the focus lens drive mechanism 44 moves the focus lens 52 in the direction of the optical axis. Further, when the user operates the zoom adjustment switch 42, the zoom lens drive mechanism 45 moves the zoom lens 53 in the direction of the optical axis.

Figure 2:
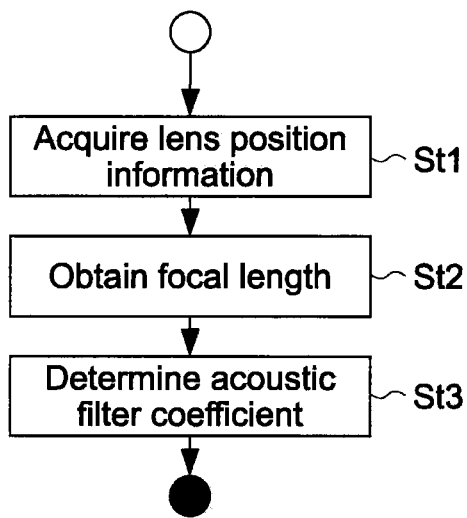
FIG. 2 is a procedure showing an operation of the audiovisual apparatus when an acoustic filter coefficient is determined.

Upon receiving from the user an input of an instruction to start reproducing content, the audiovisual apparatus 1 determines an acoustic filter coefficient used in the acoustic processing before the content is reproduced. FIG. 2 is a procedure showing the operation of the audiovisual apparatus 1 when an acoustic filter coefficient is determined.

As shown in FIG. 2, the acoustic processing circuit 34 acquires the position information of the focus lens 52 from the focus lens position detector 61, and acquires the position information of the zoom lens 53 from the zoom lens position detector 62 (St1). It should be noted that the position in question is a position along the optical axis in the optical system of the audiovisual apparatus 1 as described above. Next, the acoustic processing circuit 34 obtains a focal length of the optical system based on the position information of the focus lens 52 and the zoom lens 53 (St2). Next, the acoustic processing circuit 34 determines an acoustic filter coefficient based on the focal length (St3). The determination of an acoustic filter coefficient will be described later.

Next, the audiovisual apparatus 1 reproduces content. It should be noted that here, during the reproduction of content, the focus adjustment switch 41 and the zoom adjustment switch 42 are not operated.

Figure 3:
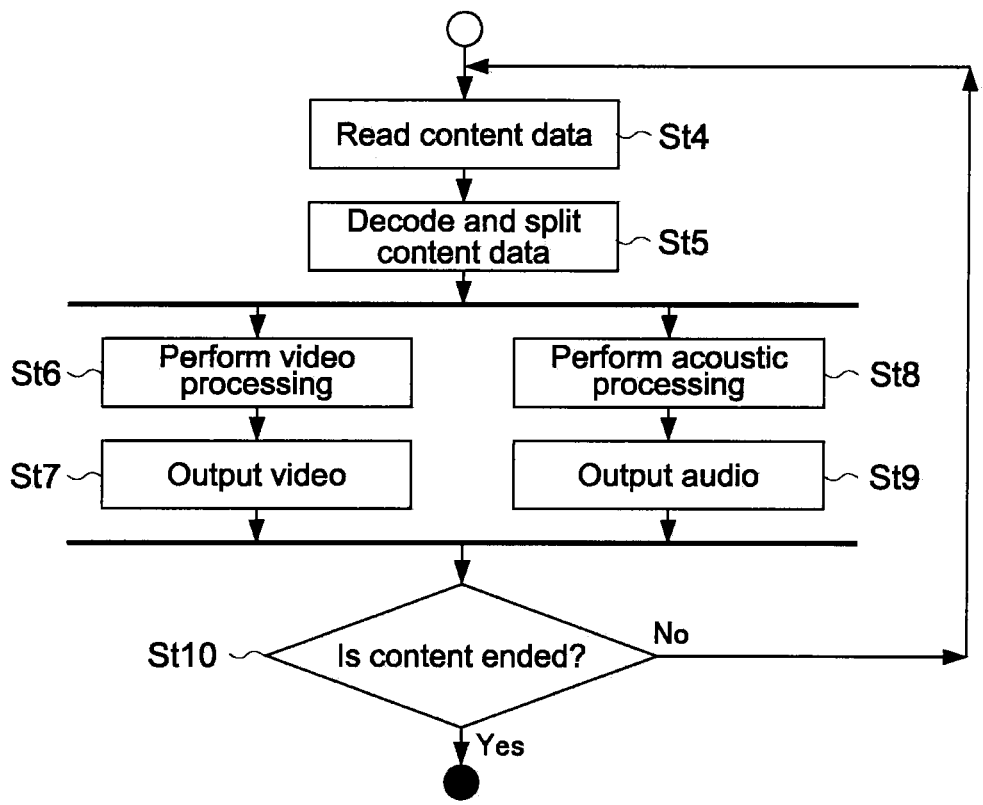
FIG. 3 is a flowchart showing an operation of the audiovisual apparatus when content is reproduced.

FIG. 3 is a flowchart showing the operation of the audiovisual apparatus 1 when content is reproduced.

When an instruction to reproduce content is given, the content expansion circuit 32 reads at least part of content data C stored in the storage section 2 (St4). Next, the content expansion circuit 32 expands and computes (performs decoding processing on) the content data C, and splits the resultant into a video signal and an audio signal (St5).

The video processing circuit 33 performs video processing on the video signal (St6) and outputs the resultant video signal to the video output device 51. The video output device 51 converts the video signal into a video beam and outputs the video beam (St7). The video beam passes though the focus lens 52 and the zoom lens 53 and is projected onto a projection target. On the other hand, the acoustic processing circuit 34 performs, on the audio signal, acoustic processing using the acoustic filter coefficient calculated in St3 described above (St8), and outputs the resultant audio signal to the D/A converter 74. The acoustic processing in St8 will be described later. The D/A converter 74 and the amplifier 73 output the audio signal that has been subjected to the acoustic processing to the speaker 71 and the headphone terminal 72 (St9).

In a case where the content data C is all read (Yes of St10), the content expansion circuit 32 terminates the reproduction of the content data. In a case where all the content data C is not read (No of St10), the content expansion circuit 32 reads the content data C again (St4). In this manner, the video of content is projected and the audio that has been subjected to the acoustic processing corresponding to the video is output.

Next, description will be given on a case where during reproduction of content, the focus adjustment switch 41 or the zoom adjustment switch 42 is operated by the user. This situation refers to, for example, a case where the audiovisual apparatus 1 is moved by the user and the focus of video is adjusted again.

It is assumed that an acoustic filter coefficient is calculated before content is reproduced and the acoustic filter coefficient is used for the acoustic processing to reproduce the content, as described above. Here, when the focus adjustment switch 41 is operated by the user, new position information of the focus lens 52 is output from the focus lens position detector 61 to the acoustic processing circuit 34. Further, when the zoom adjustment switch 42 is operated by the user, new position information of the zoom lens 53 is output from the zoom lens position detector 62 to the acoustic processing circuit 34.

When the new position information of the focus lens 52 or zoom lens 53 is output, the acoustic processing circuit 34 obtains a focal length from the position information as described above and updates the acoustic filter coefficient. For example, when an output of the A/D converter 63 fluctuates by a certain value or more, the acoustic processing circuit 34 can update the acoustic filter coefficient while assuming that new position information is output. Hereinafter, the acoustic processing circuit 34 uses the updated acoustic filter coefficient to perform the acoustic processing on the audio signal. When the focus is changed again, the acoustic processing circuit 34 updates the acoustic filter coefficient in the same manner and uses the updated acoustic filter coefficient in the acoustic processing.

Hereinafter, the acoustic processing performed by the acoustic processing circuit 34 will be described.

FIG. 4 are procedures showing the acoustic processing performed by the acoustic processing circuit 34.

Figure 4A:
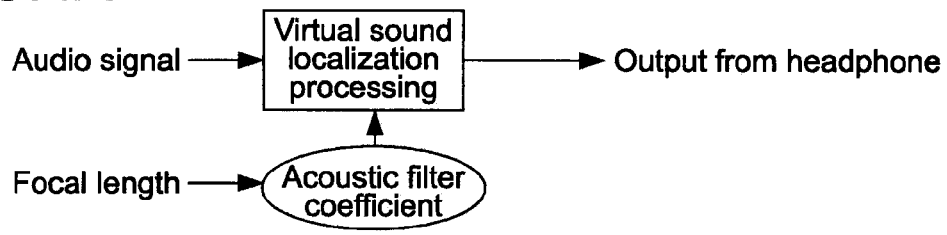
FIG. 4 are procedures showing acoustic processing performed by an acoustic processing circuit of the audiovisual apparatus.
Figure 4B:
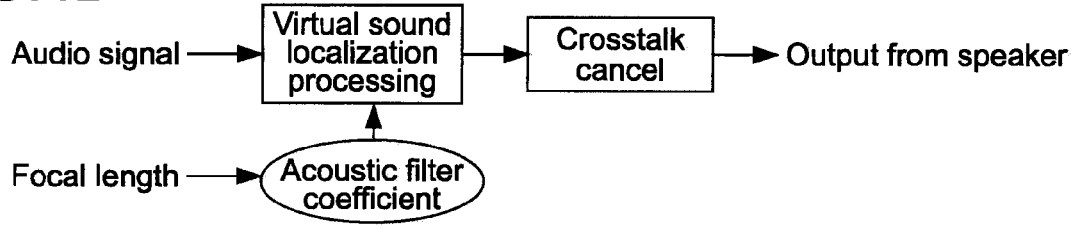

FIG. 4A is a procedure showing a case where sound is output from a headphone connected to the headphone terminal 72, and FIG. 4B is a procedure showing a case where sound is output from the speaker 71.

As shown in FIGS. 4A and 4B, the acoustic processing circuit 34 uses the acoustic filter coefficient to perform virtual sound localization processing on the input audio signal. Further, in a case where the audiovisual apparatus 1 outputs sound from the speaker 71, the acoustic processing circuit 34 performs crosstalk cancel on the audio signal that has been subjected to the virtual sound localization processing. It should be noted that the acoustic processing performed by the acoustic processing circuit 34 on the audio signal is not limited to the virtual sound localization processing.

Figure 5:
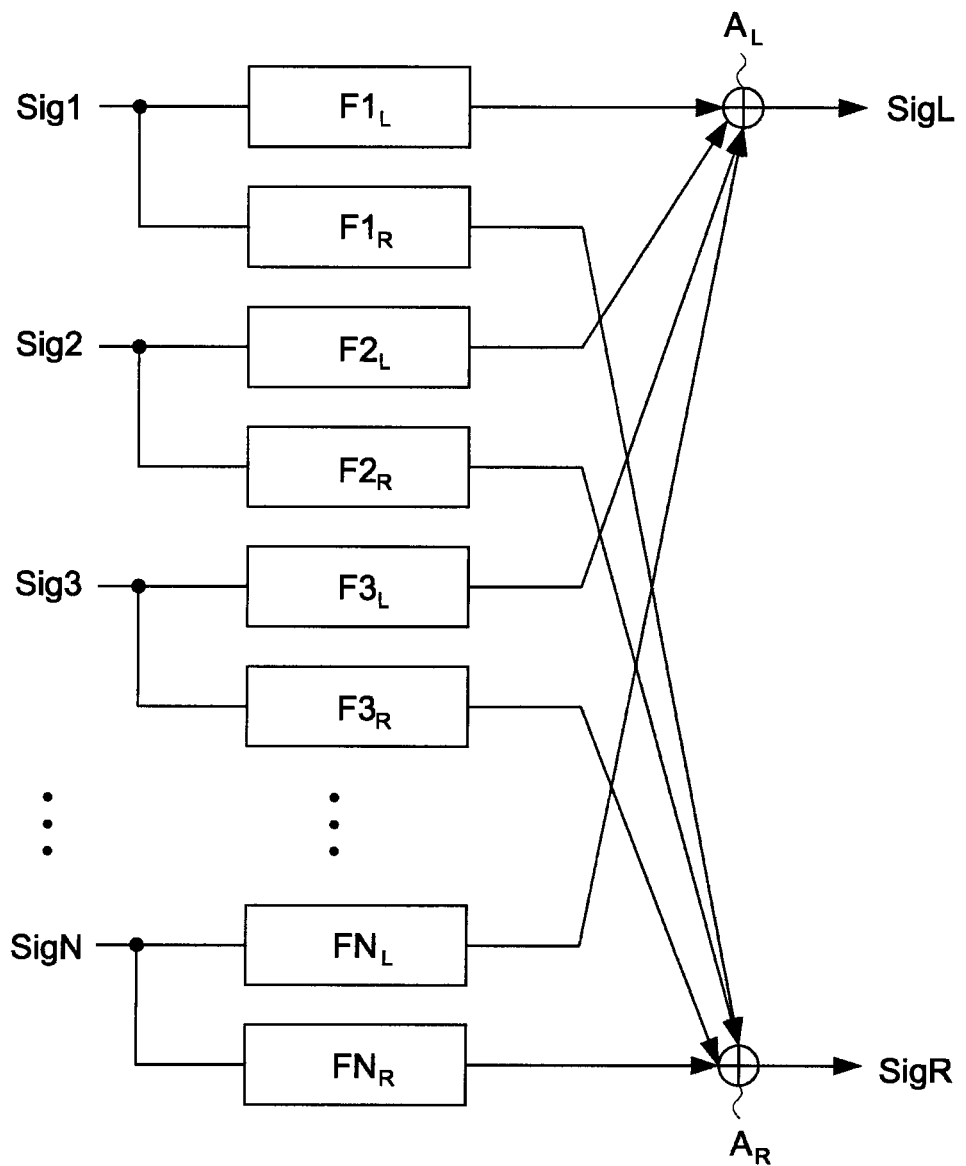
FIG. 5 is a diagram showing an example of signal processing in virtual sound localization processing by the acoustic processing circuit of the audiovisual apparatus.

FIG. 5 is a diagram showing an example of signal processing in the virtual sound localization processing.

Here, there is shown the processing for outputting audio signals (Sig1, Sig2, . . . , SigN) included in content from two channels of the left channel and the right channel. The audio signals Sig1 to SigN are audio signals of respective channels. For example, in the case of 5.1 channel system, N is 5 (excluding 0.1 channel as a range with low directivity).

As shown in FIG. 5, the acoustic processing circuit 34 uses digital filters ($F1_L$ to $FN_L$) for output from the left channel and digital filters ($F1_R$ to $FN_R$) for output from the right channel for the audio signals Sig1 to SigN. The digital filter is for imparting virtual transfer characteristics to the audio signals Sig1 to SigN. Hereinafter, the transfer characteristics will be described.

Figure 6:
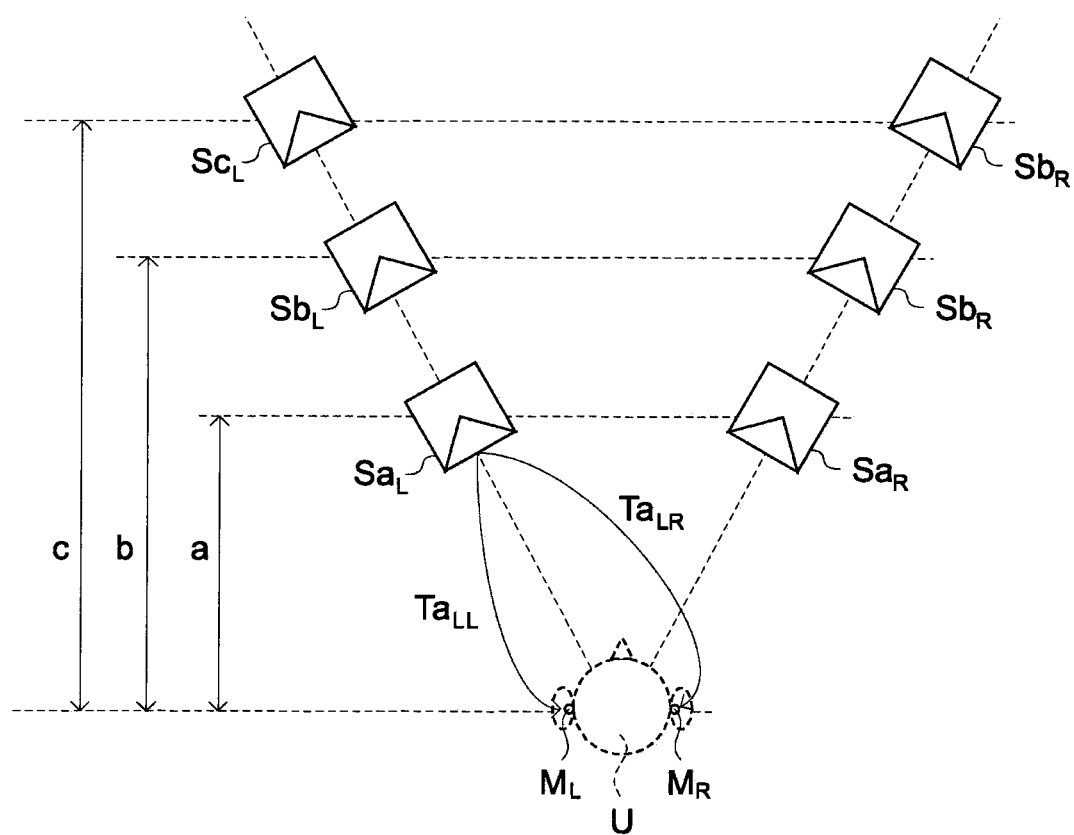
FIG. 6 is a conceptual diagram for explaining transfer characteristics between speakers and ears of a user.

FIG. 6 is a conceptual diagram for explaining the transfer characteristics. FIG. 6 shows a user U, a pair of speakers $Sa_R$ and $Sa_L$ arranged away from the user U by a distance "a", a pair of speakers $Sb_R$ and $Sb_L$, arranged away from the user U by a distance "b", and a pair of speakers $Sc_R$ and $Sc_L$ arranged away from the user U by a distance "c". The distance between the speakers $Sa_R$ and $Sa_L$, the distance between the speakers $Sb_R$ and $Sb_L$, and the distance between the speakers $Sc_R$ and $Sc_L$, are proportional to the distances "a", "b", and "c", respectively. FIG. 6 shows transfer characteristics $Ta_{LL}$ of a period of time during which sound output from the speaker $Sa_L$, reaches the left ear of the user U, and transfer characteristics $Ta_{LR}$ of a period of time during which the sound output from the speaker $Sa_L$, reaches the right ear of the user U.

Figure 7:
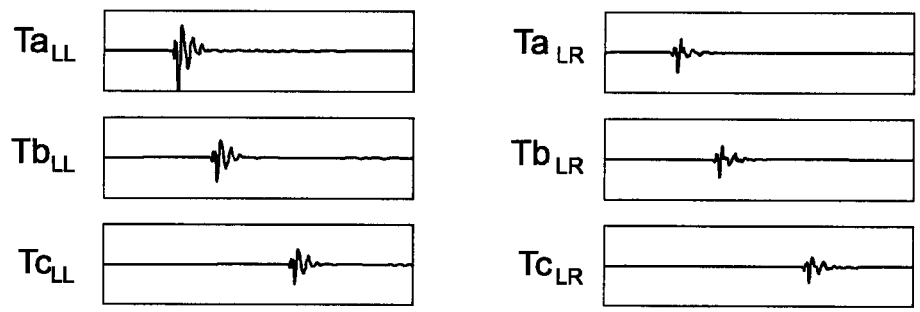
FIG. 7 is a diagram showing the transfer characteristics between the speakers and the ears of the user in a waveform.

A microphone $M_R$ is arranged at a position of the right ear of the user U, and a microphone $M_L$ is arranged at a position of the left ear of the user U. Impulse sound (short sound having flat frequency characteristics in terms of energy) is output from the respective speakers and collected with the microphone $M_R$ and the microphone $M_L$. FIG. 7 shows the transfer characteristics of a period of time during which the sound output from the speakers $Sa_L$, $Sb_L$, and $Sc_L$ reaches both the ears of the user U in a waveform of the sound collected with the microphone $M_R$ and the microphone $M_L$. As shown in FIG. 7, when the distance between the user U and the speaker differs, the waveform of the sound collected with the microphones is also different even when the sound output from the respective speakers is the same. The characteristics such as a frequency, an amplitude, a reaching time, and the like that correspond to the distance between the speaker and the microphone (ear of user) are transfer characteristics.

The transfer characteristics can be represented using a head-related transfer function. The head-related transfer function is a function showing a relationship between sound output from a sound source and sound that the user listens to. For example, in a case where sound is output from the speakers $Sa_L$ and $Sa_R$ described above, the following expression is obtained regarding the left ear of the user U.

$$Y_L(s)=H_{L\_A}(s)X_L(s)+H_{L\_B}(s)X_R(s) \quad \text{(Expression 1)}$$

$Y_L(s)$ represents an input to the left ear of a listener, $X_L(s)$ represents an output of the speaker $Sa_L$, $X_R(s)$ represents an output of the speaker $Sa_R$, $H_{L\_A}(s)$ represents a head-related transfer function between the speaker $Sa_L$ and the left ear, and $H_{L\_B}(s)$ represents a head-related transfer function between the speaker $Sa_R$ and the left ear.

As shown in Expression 1, the sound ($H_{L\_A}(s)X_L(s)$) having the transfer characteristics between the speaker $Sa_L$ and the left ear, which has been output from the speaker $Sa_L$, and the sound ($H_{L\_B}(s)X_R(s)$) having the transfer characteristics between the speaker $Sa_R$ and the left ear, which has been output from the speaker $Sa_R$, reach the left ear of the user U.

Similarly, regarding the right ear of the user U, the following expression is obtained.

$$Y_R(s)=\_H_{R\_A}(s)X_L(s)+H_{R\_B}(s)X_R(s) \quad \text{(Expression 2)}$$

$Y_R(s)$ represents an input to the right ear of the listener, $H_{R\_A}(s)$ represents a head-related transfer function between the speaker $Sa_L$ and the right ear, and $H_{R\_B}(s)$ represents a head-related transfer function between the speaker $Sa_R$ and the right ear.

As shown in Expression 2, the sound ($\_H_{R\_A}(s)X_L(s)$) having transfer characteristics between the speaker $Sa_L$ and the right ear, which has been output from the speaker $Sa_L$, and the sound ($H_{R\_B}(s)X_R(s)$) having transfer characteristics between the speaker $Sa_R$ and the right ear, which has been output from the speaker $Sa_R$, reach the right ear of the user U.

In other words, in a case where $Y_L(s)$ and $Y_R(s)$ satisfy those above expressions, the user U feels as if the speaker $Sa_R$ and the speaker $Sa_L$ output sound. Specifically, when virtual transfer characteristics are imparted to the sound output from the headphone or speaker, it is possible for the user to feel as if a sound source is present at a virtual position (virtual sound localization). At this time, the virtual sound localization is performed assuming that the audiovisual apparatus 1 is in the vicinity of the user because the audiovisual apparatus 1 is a portable projector, and the position of the speaker 71 integrally provided to the audiovisual apparatus 1 and the position of the user are the same.

Figure 8:
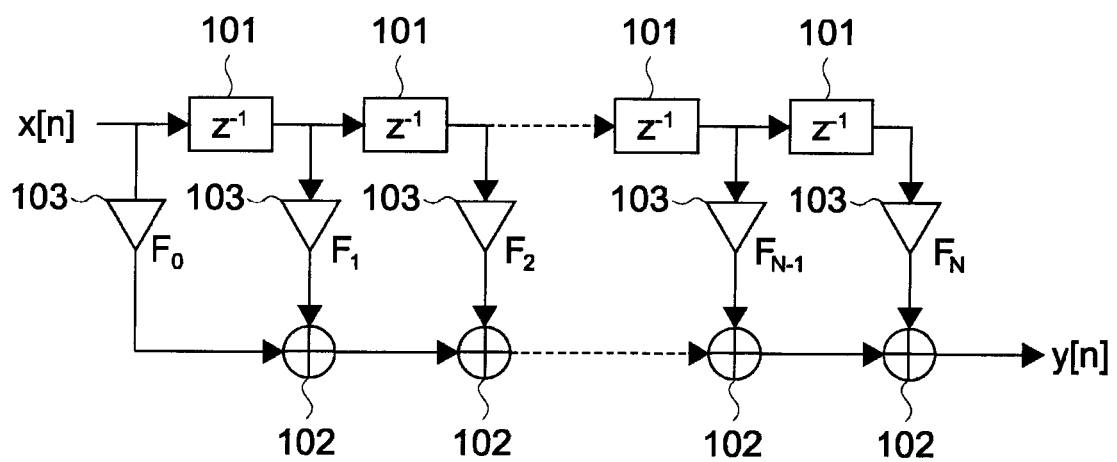
FIG. 8 is a block diagram showing a FIR filter used in the acoustic processing circuit of the audiovisual apparatus according to the first embodiment of the present invention.

Specifically, in each digital filter processing, an audio signal is subjected to FIR (Finite Impulse Response) filter, IIR (Infinite Impulse Response) filter, or the like. Hereinafter, the FIR filter will be described as an example. FIG. 8 is a block diagram showing an FIR filter. In FIG. 8, x(n) represents an input to the digital filter and y(n) represents an output of the digital filter. As shown in FIG. 8, the FIR filter is constituted of a plurality of delay blocks 101, adders 102, and multipliers 103.

The input signal (audio signal) is sequentially delayed in the delay blocks 101, and the input signal and the signal that has previously been input and delayed are multiplied in the multipliers 103 by predetermined coefficients $F_0$ to $F_N$. The coefficients $F_0$ to $F_N$ are acoustic filter coefficients. The signals multiplied by the acoustic filter coefficients $F_0$ to $F_N$ are added in the adders 102 and then output. When the acoustic filter coefficient is changed, a frequency response is changed accordingly, with the result that the virtual transfer characteristics described above can be imparted to the audio signal.

The acoustic filter coefficient is determined based on a focal length of an optical system as described above. Specifically, the acoustic processing circuit 34 can extract, from a plurality of acoustic filter coefficient candidates stored in the storage section 2, an acoustic filter coefficient corresponding to a focal length. For example, when an assumed focal length is in the range of 50 cm to 5 m, the acoustic processing circuit 34 divides this distance into 20 ranges, each of which has a length of 25 cm, and stores one acoustic filter coefficient candidate for each range. The audiovisual apparatus 1 determines an acoustic filter coefficient candidate that is assigned to the range including the acquired focal length, as an acoustic filter coefficient. This method for decision does not need computing processing for calculating an acoustic filter coefficient, and is effective particularly in a case where the audiovisual apparatus 1 is a portable projector or the like and has a limited capability of computing processing. In a case where the audiovisual apparatus 1 is a cellular phone or the like, the number of times computing processing is performed is reduced, which makes power consumption low and suppresses consumption of a battery.

In addition, the audiovisual apparatus 1 may linearly change an acoustic filter coefficient in accordance with the calculated focal length. In this case, an acoustic filter coefficient h(t) can be calculated using the following expression.

$$h(t) = a/L \cdot f(t - Lb)$$

"L" represents a ratio of the calculated focal length to a specific focal length, and "a" and "b" are arbitrary coefficients. "a/L" means that a sound level is increased or decreased in accordance with a focal length, and "f(t−Lb)" means that a phase time response is expanded or contracted in accordance with the focal length L. "f(t)" is, for example, fast Fourier transform.

In this manner, the acoustic filter coefficient is determined in accordance with the focal length. Further, by other methods, the acoustic filter coefficient may be determined in accordance with the focal length.

Referring back to FIG. 5, the acoustic processing circuit 34 adds the audio signals output from the digital filters (F1$_L$ to FN$_L$) of the left channel by an adder A$_L$, and adds the audio signals output from the digital filters (F1$_R$ to FN$_R$) of the right channel by an adder A$_R$. Accordingly, the virtual transfer characteristics are imparted to the multichannel audio signals Sig1 to SigN included in the content data C, and the audio signal SigL of the left channel and the audio signal SigR of the right channel, which have been subjected to the acoustic processing corresponding to the video signal, are generated.

Further, in a case where the audiovisual apparatus 1 outputs sound from the speaker 71, crosstalk is caused because sound output from the speaker of the left channel arrives at the right ear of a listener and sound output from the speaker of the right channel arrives at the left ear of the listener. For that reason, the acoustic processing circuit 34 performs crosstalk cancel on the audio signals SigL and SigR. For the crosstalk cancel, a well-known technique can be used.

As described above, the audio signals SigL and SigR that have been subjected to the acoustic processing by the acoustic processing circuit 34 are output to the speaker 71 and the headphone terminal 72 via the D/A converter 74 and the amplifier 73, and then audio is output from the headphone connected to the speaker 71 or the headphone terminal 72.

Figure 9:
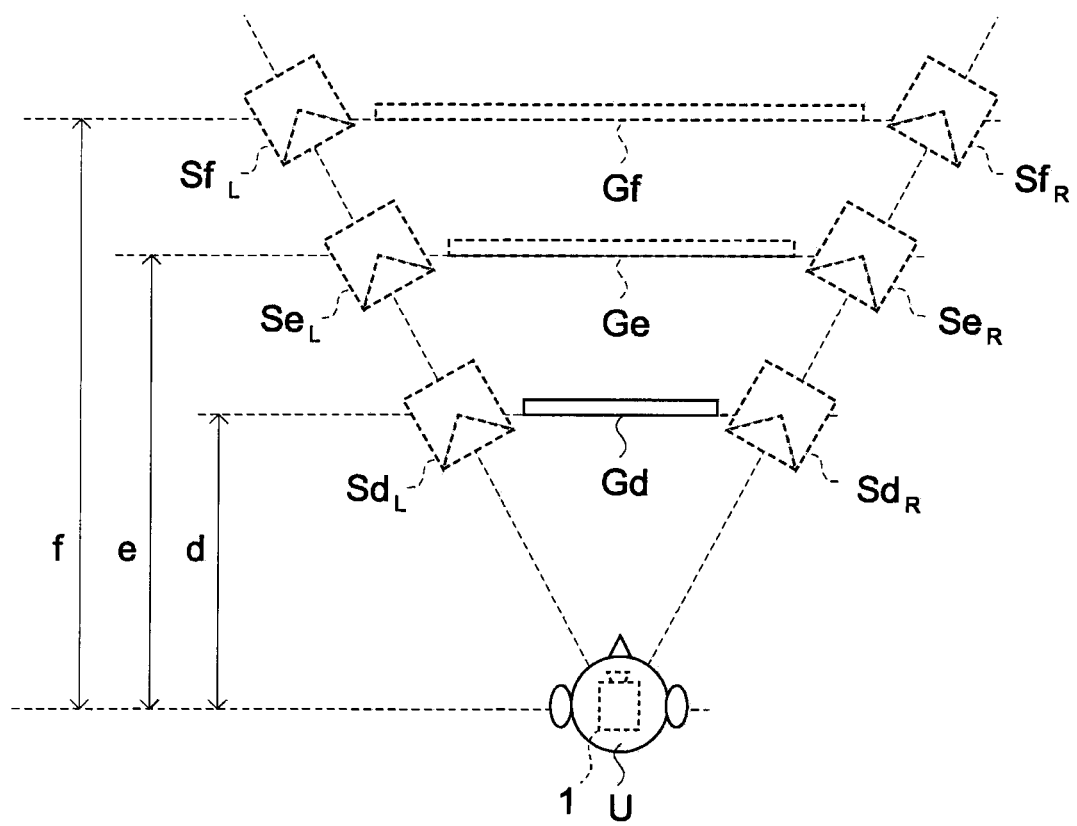
FIG. 9 is a schematic diagram showing a state where the audiovisual apparatus projects video and outputs audio.

FIG. 9 is a schematic diagram showing a state where the audiovisual apparatus 1 projects video and outputs audio. FIG. 9 shows the audiovisual apparatus 1, the user U, and a video screen Gd on which video is projected from the audiovisual apparatus 1. The audiovisual apparatus 1 and the user U are in the same position.

As described above, the acoustic processing circuit 34 performs acoustic processing based on the focal length calculated from the position information of the focus lens 52 and zoom lens 53. In this case, the acoustic processing circuit 34 can perform virtual sound localization at a position separated by the calculated focal length "d" in the direction of the optical axis of the optical system. The position separated by the focal length "d" in the direction of the optical axis of the optical system can be considered as a position onto which video is being projected, and the audio subjected to acoustic correction based on the focal length by the acoustic processing circuit 34 can be subjected to sound localization at the positions of the virtual sound sources Sd$_L$, and Sd$_R$ on the right and left of the video screen Gd. Accordingly, it is possible for the user to feel as if audio is output from the video screen Gd.

When the focus of the audiovisual apparatus 1 is changed and the audiovisual apparatus 1 projects video onto a video screen Ge at a projection distance "e", the audiovisual apparatus 1 performs acoustic processing based on a new focal length. As in the aforementioned case, the audiovisual apparatus 1 can perform sound localization at the positions of virtual sound sources Se$_L$ and Se$_R$ on the right and left of the video screen Ge.

When the audiovisual apparatus 1 projects video onto a video screen Gf at a projection distance f, the audiovisual apparatus 1 similarly performs sound localization at the positions of virtual sound sources Sf$_L$, and Sf$_R$.

As described above, the audiovisual apparatus 1 according to this embodiment acquires a focal length of the optical system based on the position information of the focus lens 52 and zoom lens 53, and determines an acoustic filter coefficient based on the focal length.

By considering the focal length as a projection distance, it is possible to perform acoustic processing corresponding to the position of projected video, for example, virtual sound localization in the vicinity of a video screen.

(Second Embodiment)

An audiovisual apparatus according to a second embodiment of the present invention will be described.

Figure 10:
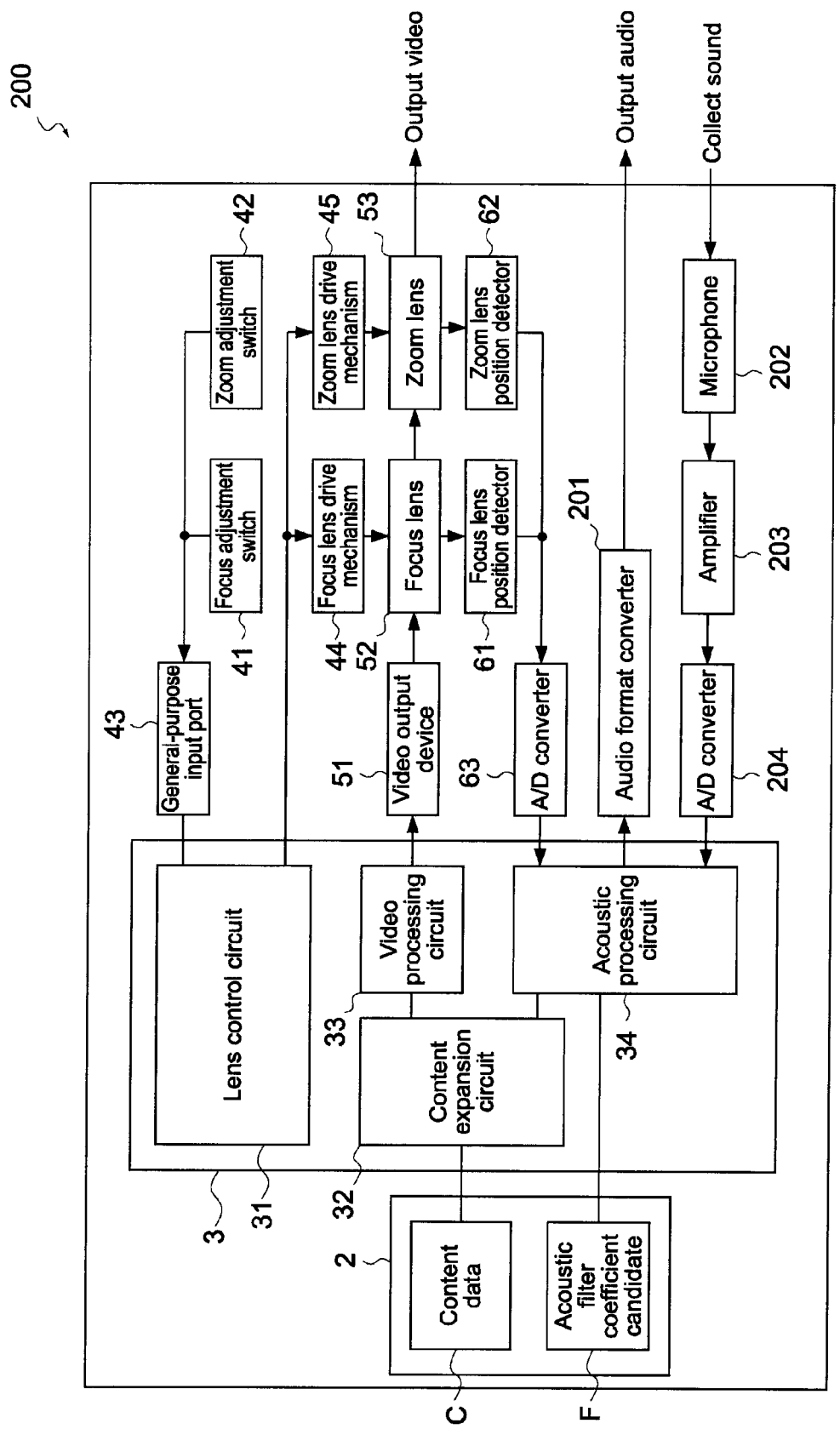
FIG. 10 is a block diagram showing the structure of an audiovisual apparatus according to a second embodiment of the present invention.

FIG. 10 is a block diagram showing the structure of an audiovisual apparatus 200 according to the second embodiment.

It should be noted that in the following description, the same structure of the audiovisual apparatus 200 as that of the audiovisual apparatus 1 according to the first embodiment will be denoted by the same reference symbols and description thereof will be omitted.

The audiovisual apparatus 200 is a portable projector. However, the audiovisual apparatus 200 is different from the audiovisual apparatus 1 that is integrally formed with a speaker and outputs audio from a speaker separately arranged from the audiovisual apparatus 200.

As shown in FIG. 10, the audiovisual apparatus 200 further includes an audio format converter 201, a microphone 202, an amplifier 203, and an A/D converter 204. The audio format converter 201 is connected to the acoustic processing circuit 34. The microphone 202 is connected to the acoustic processing circuit 34 via the amplifier 203 and the A/D converter 204.

The audio format converter 201 includes an A/D converter, an output terminal, and the like, and may be a converter conforming to various standards of audio communication, such as "S/PDIF (Sony Philips Digital InterFace)" (registered trademark) and "HDMI (High-Definition Multimedia Interface)" (registered trademark).

Analog output may be possible without being limited to digital output. Further, the number of output channels is arbitrary set, and a multichannel format such as "Dolby Digital" (registered trademark) and "DTS (Digital Theater Systems)" (registered trademark) may be used. The audio format converter 201 is connected with an external speaker to be described later.

The microphone 202 is for judging relative positions of the external speaker and the audiovisual apparatus 200, and a nondirectional microphone is suitable. The microphone 202 outputs an audio signal of collected sound to the acoustic processing circuit 34 via the amplifier 203 and the A/D converter 204.

The operation of the audiovisual apparatus 200 structured as described above will be described.

Upon receiving from the user an input of an instruction to start reproducing content, the audiovisual apparatus 200 determines an acoustic filter coefficient used in the acoustic processing before the content is reproduced, as in the case of the audiovisual apparatus 1.

Figure 11:
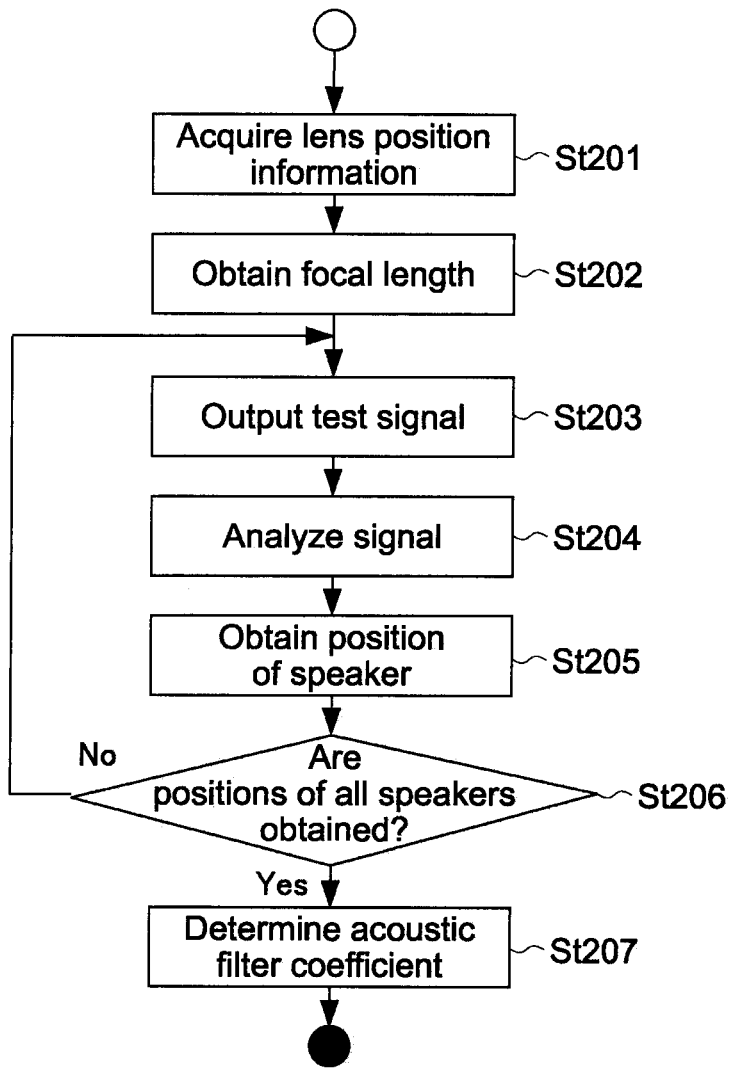
FIG. 11 is a flowchart showing the operation of the audiovisual apparatus when an acoustic filter coefficient is determined.

FIG. 11 is a flowchart showing the operation of the audiovisual apparatus 200 when the acoustic filter coefficient is determined.

As shown in FIG. 11, the acoustic processing circuit 34 acquires the position information of the focus lens 52 from the focus lens position detector 61 and acquires the position information of the zoom lens 53 from the zoom lens position detector 62 (St201) in the same manner as in the first embodiment. Next, the acoustic processing circuit 34 obtains a focal length of the optical system based on the position information of the focus lens 52 and the zoom lens 53 (St202). Next, the acoustic processing circuit 34 calculates the position of the external speaker (St203 to St206). Hereinafter, the position calculation of the external speaker will be described.

Figure 12:
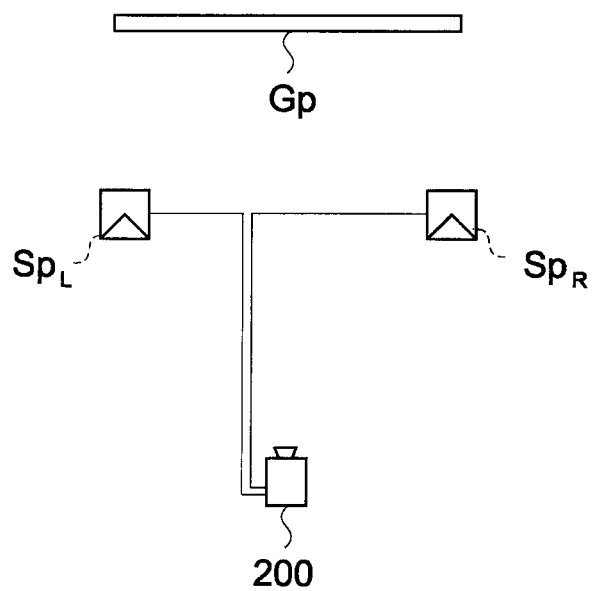
FIG. 12 is a schematic diagram for explaining a position calculation of an external speaker by an acoustic processing circuit of the audiovisual apparatus.

FIG. 12 is a schematic diagram for explaining the position calculation of an external speaker.

As shown in FIG. 12, the audiovisual apparatus 200 is connected with external speakers $Sp_L$, and $Sp_R$. The external speaker has two channels on the right and left, though not limited thereto. It is assumed that the audiovisual apparatus 200 projects video onto a video screen Gp, and the audiovisual apparatus 200 and the external speakers $Sp_L$, and $Sp_R$ are disposed away from each other.

In the audiovisual apparatus 1 according to the first embodiment, the speaker is incorporated therein. Thus, the acoustic processing circuit 34 merely has to use the relative positions of the audiovisual apparatus 1 and a video screen for the acoustic processing. However, in the audiovisual apparatus 200 according to this embodiment, the speaker is not incorporated in the audiovisual apparatus 200, and therefore it is necessary to determines the relative positions of the audiovisual apparatus 200 and the external speakers $Sp_L$ and $Sp_R$ for the acoustic processing.

The acoustic processing circuit 34 outputs a test signal to the external speaker $Sp_L$ via the audio format converter 201 (St203). The test signal may be a TSP (Time Stretched Pulse) signal. The external speaker $Sp_L$, outputs sound upon receiving the test signal. The microphone 202 collects the sound output from the external speaker $Sp_L$, and outputs an audio signal to the acoustic processing circuit 34 via the amplifier 203 and the A/D converter 204.

The acoustic processing circuit 34 analyzes the audio signal (St204). The acoustic processing circuit 34 applies IFFT (Inverse Fast Fourier Transform) to a TSP response time axis waveform data of the sound that is collected by the microphone 202, for example, to calculate impulse response time axis waveform data, and estimates the position of the external speaker $Sp_L$, based on transfer characteristics thereof (St205). Next, the acoustic processing circuit 34 estimates the position of the external speaker $Sp_R$ in the same manner (No of St206).

The acoustic processing circuit 34 estimates the positions of all the external speakers $Sp_R$ and $Sp_L$, (Yes of St206), and then determines an acoustic filter coefficient (St207). It should be noted that the order of performing the calculation of a focal length (St201 and St202) and the estimation of the position of external speakers (St203 to St206) may be reversed.

The acoustic processing circuit 34 determines an acoustic filter coefficient based on the position information of the external speakers $Sp_L$, and $Sp_R$, which is obtained in St203 to St206, in addition to the focal length of the optical system that is obtained in the St201 and St202 described above. If the acoustic processing circuit 34 determines an acoustic filter coefficient on the assumption that the external speakers $Sp_R$ and $Sp_L$, are not separated from the audiovisual apparatus 1 as in the case of the first embodiment, the position of the virtual sound localization differs due to real transfer characteristics between the external speakers $Sp_L$, and $Sp_R$ and both ears of the user U.

Here, the acoustic processing circuit 34 determines an acoustic filter coefficient while considering real transfer characteristics with respect to the external speakers $Sp_R$ and $Sp_L$, and the left and right ears of the user U (at the same position as the audiovisual apparatus 200), based on the positions of the external speaker $Sp_L$, and $Sp_R$ that are estimated in St203 to St206. Accordingly, the audiovisual apparatus 200 enables virtual sound localization at any position, for example, in the vicinity of the video screen Gp wherever the external speakers $Sp_L$, and $Sp_R$ are disposed.

The present invention is not limited to the embodiments described above, and can be variously changed without departing from the gist of the present invention.

Figure 13:
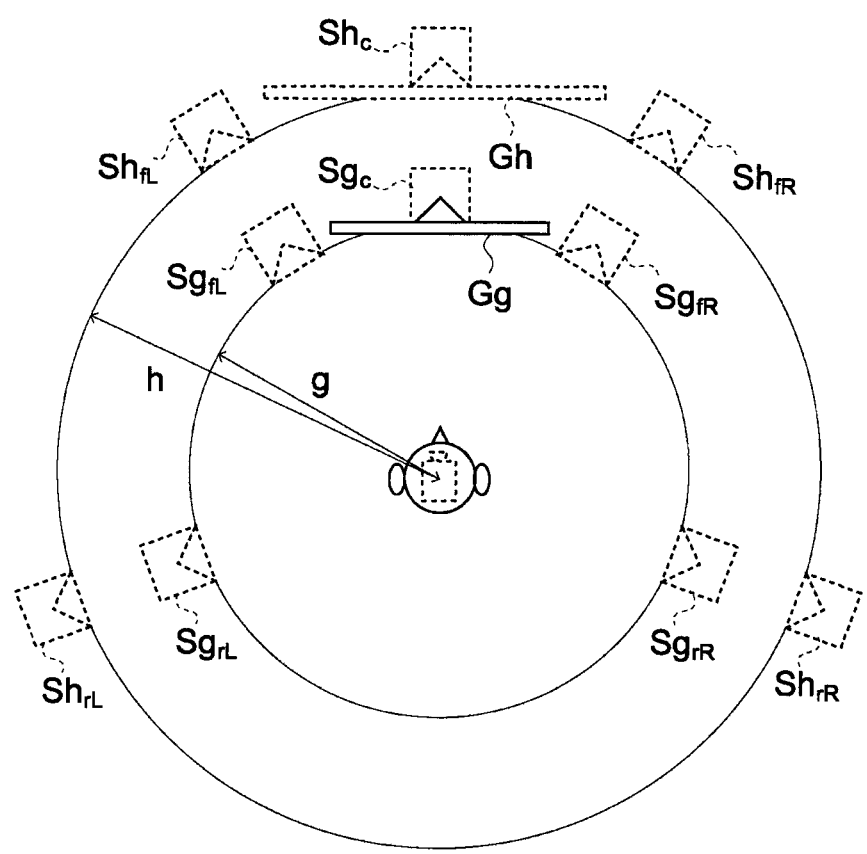
FIG. 13 is a schematic diagram showing an example of a position of a video screen and a position of virtual sound localization in an audiovisual apparatus according to a modified example.

In the embodiments described above, the virtual sound localization is performed on the right and left of a video screen onto which video is projected, but the present invention is not limited thereto. FIG. 13 is a schematic diagram showing the position of a video screen and the position of virtual sound localization in a case where the virtual sound localization is performed at the positions of respective speakers corresponding to 5.1 channels. As shown in FIG. 13, for example, in a case where the audiovisual apparatus projects video onto a video screen Gg at a distance "g", it is possible to perform virtual sound localization at the positions of a center speaker $Sg_c$, a left front speaker $Sg_{fL}$, a right front speaker $Sg_{fR}$, a left rear speaker $Sg_{rL}$, and a right rear speaker $Sg_{rR}$, each of which is away from the audiovisual apparatus by a distance "g".

Further, in a case where the audiovisual apparatus projects video onto a video screen Gh at a distance "h", it is possible to perform virtual sound localization at the positions of a center speaker $Sh_c$, a left front speaker $Sh_{fL}$, a right front speaker $Sh_{fR}$, a left rear speaker $Sh_{rL}$, and a right rear speaker $Sh_{rR}$, each of which is away from the audiovisual apparatus by a distance "h".

In the embodiments described above, the audiovisual apparatus includes a focus adjustment switch and a zoom adjustment switch, and adjusts the positions of the focus lens and the zoom lens in the optical system in accordance with the operations made by the user, but the present invention is not limited thereto. The audiovisual apparatus may have an auto-focus mechanism instead of the focus adjustment switch and the zoom adjustment switch, to automatically adjust the positions of the focus lens and the zoom lens. Further, instead of the focus adjustment switch and the zoom adjustment switch, a dial or the like for the user directly changing the positions of the focus lens and the zoom lens may be provided.

In the embodiments described above, the audiovisual apparatus projects a video beam output from a video output device through the focus lens and the zoom lens, but the present invention is not limited thereto. For example, a focus lens and a zoom lens may not be provided, and a video beam in which a focus is adjusted by the video output device may be output. In this case, the acoustic processing circuit can acquire a focal length based on the information from the video output device.

In the embodiments described above, the audiovisual apparatus is a portable projector, but the present invention is not limited thereto. For example, the audiovisual apparatus can be structured by connecting a main body having a video projection function with a dock having an audio output function.

The present application contains subject matter related to that disclosed in Japanese Priority Patent Application JP 2010-051969 filed in the Japan Patent Office on Mar. 9, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audiovisual apparatus, comprising:
   a video projection section configured to project video corresponding to a video signal, wherein a focal length of the projected video corresponds to a video projection distance;
   a focal length adjustment section configured to adjust the focal length of the projected video;
   an acoustic processing section configured to perform acoustic processing on an audio signal corresponding to the video signal, wherein the acoustic processing section performs virtual sound localization at a position of a display onto which the video is projected and separated by the adjusted focal length in a direction of an optical axis of a projection lens of the video projection section; and
   an audio output section configured to output the audio signal on which the acoustic processing is performed.

2. The audiovisual apparatus according to claim 1, wherein the acoustic processing section includes a digital filter for performing the acoustic processing on the audio signal, and determines a filter coefficient of the digital filter in accordance with the adjusted focal length.

3. The audiovisual apparatus according to claim 2, wherein the acoustic processing section selects a filter coefficient corresponding to the adjusted focal length from filter coefficient candidates stored in advance for each distance range.

4. The audiovisual apparatus according to claim 3, wherein the focal length adjustment section adjusts a position of the projection lens.

5. The audiovisual apparatus according to claim 2, wherein the adjusted focal length is based on the position of the projection lens along the optical axis.

6. The audiovisual apparatus according to claim 5, wherein the position of the projection lens is controlled by a projection adjustment switch.

7. The audiovisual apparatus according to claim 1, further comprising
   a microphone configured to collect audio that is output from an external speaker arranged away from the audiovisual apparatus, wherein
   the acoustic processing section estimates a position of the external speaker based on an output of the microphone, and further performs the acoustic processing based on the position of the external speaker.

8. The audiovisual apparatus according to claim 1, wherein the acoustic processing section is further configured to impart virtual transfer characteristics to the audio signal.

9. The audiovisual apparatus according to claim 1, wherein the audiovisual apparatus is a cellular phone.

* * * * *